July 4, 1939.  N. B. GREEN  2,165,137
PHOTOGRAPHIC SHUTTER
Filed June 8, 1938
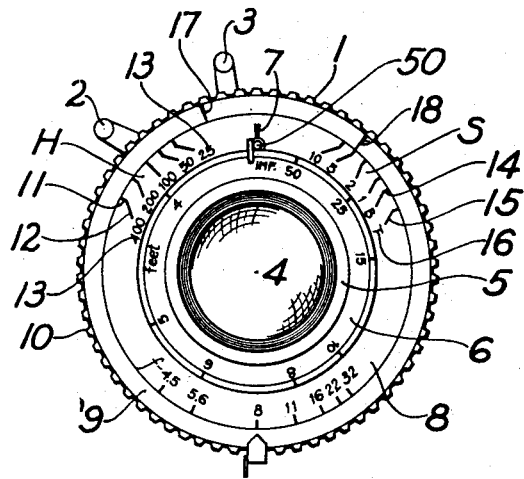
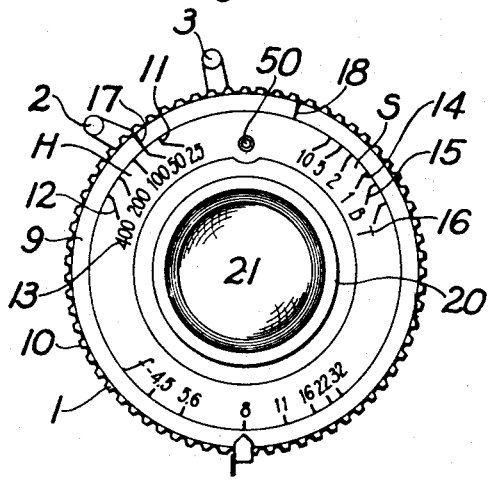
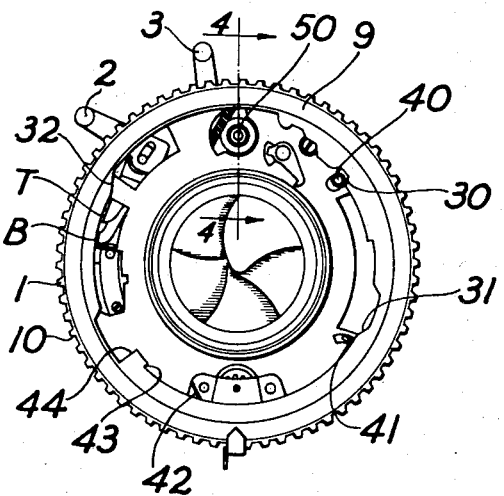
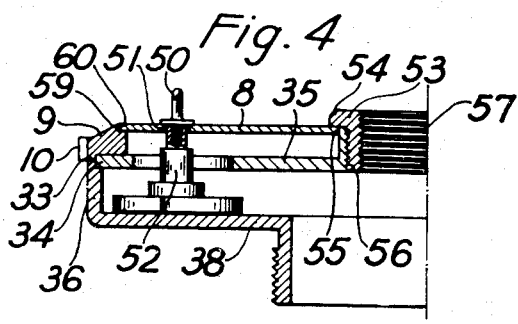
Newton B. Green
INVENTOR
BY
ATTORNEYS Patented July 4, 1939

2,165,137

UNITED STATES PATENT OFFICE 2,165,137

PHOTOGRAPHIC SHUTTER

Newton B. Green, Rochester, N. Y., assignor to Eastman Kodak Company, Rochester, N. Y., a corporation of New Jersey Application June 8, 1938, Serial No. 212,494

4 Claims. (Cl. 95—63)

This invention relates to photography and more particularly to photographic shutters. One object of my invention is to provide a shutter with a dial divided into two parts, one part preferably containing the indicating characters for relatively fast exposures, sometimes known as "hand" exposures, and the other containing the indicating characters for relatively slow exposures, sometimes known as "stand" exposures. Another object of my invention is to provide a shutter setting ring having two pointers spaced apart, one pointer being adapted to cooperate with one scale and the other pointer being adapted to cooperate with the other scale. Another object of my invention is to provide a shutter in which the relative positions of the two scales and the two pointers is such that only one pointer may cooperate with one scale at a time. Another object of my invention is to provide a shutter in which the graduations of each scale are so arranged that the indicating characters on the scales may be spread apart and may be relatively large so that they are readily legible. Still another object of my invention is to provide a shutter setting ring so arranged that a "hand" exposure or a "stand" exposure can be rapidly and easily selected by an operator by turning the dial, and to provide a dial which tends to call to the attention of the operator the type of exposure for which the shutter is set. Other objects will appear from the following specification, the novel features of which are pointed out in the claims at the end thereof.

Coming now to the drawing in which like reference characters denote like parts throughout.

Figure 1 is a front elevation of a shutter constructed in accordance with, and embodying a preferred form of my invention.

Figure 2 is a view similar to Figure 1, but with a shutter of slightly different construction.

Figure 3 is a similar view with the shutter cover plate bearing the scales removed.

Figure 4 is an enlarged sectional view taken on the line 44 of Figure 3 with the shutter cover added.

In the modern photographic shutters of certain types, a large number of different shutter speeds can be made and there has been considerable difficulty in the past in arranging the scales on such shutters so that the characters and graduations are easily visible, because the space left on the shutter covers is quite restricted, particularly in view of the fact that relatively wide aperture lenses are frequently used.

While shutter scales have been provided in which the graduations may be closely spaced, and in which the graduation marks may be spread apart at their opposite ends to provide more room for the speed indicating marks, such an arrangement is not satisfactory for a shutter having a large number of different shutter settings and where the number of shutter settings is over six or eight, it is extremely difficult to make a shutter scale legible, and to provide graduations leading to the speed indicating marks which are readily legible.

In accordance with my invention which is now being described, I have provided a simple means of overcoming the usual difficulties by dividing the shutter scale into two parts, separating the speed indicating characters in each separate section, and by including two pointers on the speed setting dial, only one of which may cooperate with one scale at a time. Such a construction not only has the advantage of permitting the larger and more legible scale to be used, but in addition, it serves as a memory cue to an operator to indicate which speed settings may be used for "hand" exposures, and which speed settings should be used for "stand" exposures. Thus errors which frequently occur by attempting to make an automatic slow exposure while holding the camera in the hand are eliminated.

Coming now to the drawing, in the preferred form of my invention shown in Figure 1, the shutter designated broadly as 1 may be provided with the usual trigger 2 and the usual setting-lever 3. A front lens element 4 may be carried by a lens cell 5 which is here shown as being revolubly mounted for focusing by bringing a graduation on the scale 6 opposite to a pointer 7 to indicate the distance on which the objective is focused.

Such focusing objectives require considerable space, covering up a material portion of the shutter cover 8 and consequently, comparatively little space is left for the shutter setting ring 9 which may be turned by the knurled edge 10 and the scales designated broadly as H and S.

The scale indicated at H may be considered the "hand" exposure scale, and the scale indicated at S may be considered the "stand" exposure scale, because when any of the settings of the scale S are used, it is desirable to use a tripod or other support to prevent the camera from vibration.

Scale H is provided with a series of graduations 11, the ends of which 12 are spaced further apart than the portions of these graduations lying next to the speed setting ring 9. Thus additional room is given for the individual speed markings 13, and as will be seen from the drawing, there is sufficient room to make these markings legible.

In a similar manner, the graduations 14 of scale S and their opposite ends, or the ends spaced from the ring 9 are spaced further apart toward the center of the shutter as indicated at 15 to provide more room for the exposure indicating graduations 16.

The exposure setting dial 9 is provided with a pair of spaced pointers 17 and 18, pointer 17 being adapted to cooperate only with the graduations of scale H, and pointer 18 being adapted to cooperate only with the graduations of the scale S. In other words, when the exposure setting dial 9 is moved a maximum distance in a clockwise direction, the pointer 18 will lie over the graduation for time exposures at the extreme right of the scale S in which position the pointer 17 will not yet have reached the first graduation of the scale S which in this case is "10."

When the exposure setting dial 9 is moved a maximum distance in a counter-clockwise direction, the pointer 17 will have reached the graduation 13, here shown as "400" indicating that the shutter is set for 1/400 of a second. Here again the opposite pointer 18 is inoperative, because it moves between the two scales and never reaches the first graduation "25" indicating 1/25 of a second of scale H.

Thus only one dial may be used at a time. Not only does this separate the scale numerals and permit them to be more legible, but it indicates to the operator how the camera should be used—either in the hand or on a stand. I find it convenient to make one scale such as scale H and one pointer such as pointer 17 of a contrasting color from the other scale and prefer to make the scale H and pointer 17 of black enamel for instance, and to make the scale S and the pointer 18 in red enamel. This contrasting color assists in calling to the attention of the operator the particular setting of the shutter.

In shutters utilizing an objective which is moved as a unit for focusing, there is somewhat more space on the shutter cover for the necessary exposure indicating characters, and accordingly they can be made larger as indicated in Figure 2. In this form of my invention, the same type of scales H and S are employed with the same exposure setting dial 9. The only difference is that since the flange 20 of the objective, the front element 21 of which is shown in the drawing, is smaller in diameter than the diameter of the focusing lens mount above described, there is more room for larger characters 13 and 16 on the two scales. It is still necessary, to provide the largest practical scales, to separate the scales H and S into two parts, because considerable additional room can thus be obtained. It is quite obvious that if the scales H and S were combined in a single scale, that the exposure-indicating characters would either have to be much smaller or the scribed markings 11 and 15 would have to be spread out a far greater distance, thus causing confusion in reading the scale.

In the preferred form of my invention described above I may use any standard type of shutter. The setting ring 9 may be of the type bearing a series of cam surfaces 30, 31 and 32 about an inner periphery of the ring, and this periphery also carries a shoulder 33 which may turn on a complementary-shaped shoulder 34 formed by the junction of the shutter plate 35 and an edge wall 36 of the shutter casing 38.

In such an exposure setting dial, the cam 30 may control the position of a gear-moving pin 40 which regulates the effectiveness of gear-train and the cam 31 may alter the position of the pallet, which adjusts the effectiveness of an anchor to retard the gear-train. The cam 32 may control the position of a time lever T and a bulb lever B.

The exposure setting dial is mounted to oscillate between two positions of rest or between two stops. One stop is formed by the upstanding lug 42 which may be struck by shoulder 43 when the dial 9 is turned to its maximum counter-clockwise position. The opposite stop may be formed by the shoulder 44 coming to rest against the upstanding bulb lever B when the setting dial is moved to its maximum clockwise position. Thus the dial may oscillate between these two positions on the shutter casing 38, and at the same time the shutter cover plate 8 must be held against movement as indicated in Figure 4. This may be done by means of an upstanding pin 50 passing through an aperture 51 in the shutter cover, and having a threaded connection with a part 52 of the shutter mechanism. This pin prevents the shutter cover 8 from rotating. However, the shutter cover plate is held against the shutter by means of the threaded ring 53 and an overhanging flange 54 for engaging the inner edge 55 of the shutter cover plate 8, this ring having a threading connection at 56 with the shutter partition plate 35.

In the embodiment of my invention shown in Figure 1 the focusing lens mount 5 has a threaded connection with the ring 53 screwing into the thread 57. Using the second form of my invention illustrated in Figure 2 the lens cell 20 may screw directly into the threaded opening 57.

Since the exposure setting dial 9 turns relative to the cover plate 8 in order to make a satisfactory dust-proof connection I prefer to form a groove 59 in the edge of the exposure setting dial 9 to receive the periphery 60 of the shutter cover plate 8. Thus when the dial 9 is turned, it will slide on the concentric flanges 33 and 34 and the complementary-shaped groove 59 will slide about the periphery 60.

While I have described preferred embodiments of my invention, it is of course possible to alter the above described construction without departing from my invention, and I claim as a part of my invention all such forms as come within the scope of the appended claims.

What I claim is:

1. In a photographic shutter, the combination with a shutter casing, of a cover plate therefor, mechanism in the shutter for producing a plurality of different exposures, a pair of scales spaced apart on the shutter cover, each scale comprising a group of lines indicating various of the plurality of different exposures, the two groups of lines being spaced apart on the cover plate, an exposure setting dial for controlling the shutter mechanism oscillatably mounted on the shutter and movable a distance less than the distance between the extreme lines of the two groups, and a pair of spaced pointers carried by the exposure setting dial, one pointer being positioned to cooperate with only one scale.

2. In a photographic shutter, the combination with a shutter casing, of a cover plate therefor, mechanism in the shutter for producing a plurality of different exposures, a pair of scales spaced apart on the shutter cover, each scale comprising a group of lines indicating various of the plurality of different exposures, the two groups of lines being spaced apart on the cover plate, an exposure setting dial for controlling the shutter mechanism oscillatably mounted on the shutter and movable a distance less than the distance between the extreme lines of the two groups, a pair of spaced pointers carried by the exposure setting dial, one pointer being positioned to cooperate with only one scale, the spacing of the pointers being such that when one pointer is operatively positioned with relation to one scale, the other pointer is not operatively positioned with relation to the other scale whereby only one scale and pointer may be used at one time to indicate a predetermined exposure.

3. In a photographic shutter, the combination with a shutter casing, of a cover plate therefor, mechanism in the shutter for producing a plurality of different exposures, a pair of scales spaced apart on the shutter cover, each scale including a group of lines for indicating different exposures having an overall dimension not greater than the spacing between the two groups of lines, one scale including a group of exposures suitable for "hand" exposures, and the other scale including a group of exposures suitable for "stand" exposures, an oscillatably mounted exposure setting dial for controlling the mechanism for producing exposures having a movement on the shutter not greater than the sum of the spacing between the two groups of lines, and a pair of pointers carried by the oscillatable setting dial spaced apart a distance at least as great as the spacing of the groups of lines included in the group of lines forming a scale of the greater overall dimension.

4. In a photographic shutter, the combination with an annular shutter casing, of an annular cover plate therefor, mechanism contained in the shutter for making a plurality of different exposures, an oscillatable dial carried by the shutter and movable through a fixed path on the shutter for controlling the mechanism for producing the different exposures, a pair of spaced pointers carried by the oscillatable dial having a predetermined spacing, a pair of scales each including a spaced group of lines indicating different exposures, said scales including lines being spaced apart a distance not less than the spacing between the pointers, and each scale and its group of indicating lines having an overall dimension not greater than said space between the two pointers, whereby only one pointer and scale may cooperate at one time to indicate an exposure.

NEWTON B. GREEN.